(12) United States Patent
Foster

(10) Patent No.: US 7,637,232 B2
(45) Date of Patent: Dec. 29, 2009

(54) FLAMELESS BOILER

(75) Inventor: Robert Joseph Foster, Calgary (CA)

(73) Assignee: Leader Energy Services Ltd. (CA)

( * ) Notice: Subject to any disclaimer, the term of this patent is extended or adjusted under 35 U.S.C. 154(b) by 718 days.

(21) Appl. No.: 10/912,821

(22) Filed: Aug. 6, 2004

(65) Prior Publication Data

US 2006/0185621 A1 Aug. 24, 2006

(51) Int. Cl.
*F22B 3/06* (2006.01)

(52) U.S. Cl. .................. 122/26; 237/12.3 R; 126/247

(58) Field of Classification Search .................. 122/26; 237/12.3 R, 12.3 B; 126/247; 166/303, 305.1, 166/384

See application file for complete search history.

(56) References Cited

U.S. PATENT DOCUMENTS

| | | | | |
|---|---|---|---|---|
| 4,409,927 A | * | 10/1983 | Loesch et al. | 122/26 |
| 4,438,729 A | * | 3/1984 | Loesch et al. | 122/26 |
| 4,458,633 A | * | 7/1984 | Loesch et al. | 122/26 |
| 5,279,262 A | | 1/1994 | Muehleck | |
| 5,957,122 A | * | 9/1999 | Griggs | 126/247 |
| 6,596,178 B1 | * | 7/2003 | Archibald et al. | 210/774 |
| 7,032,464 B2 | * | 4/2006 | Lo | 73/862.14 |
| 2003/0223890 A1 | * | 12/2003 | Lo | 417/313 |

* cited by examiner

*Primary Examiner*—Gregory A Wilson
(74) *Attorney, Agent, or Firm*—Lerner, David, Littenberg, Krumholz & Mentlik, LLP

(57) ABSTRACT

A flameless boiler comprising generator means for generating heat in fluid circulated therethrough by shearing of the fluid; a prime mover drivingly connected to the generator means for shearing of the fluid; a supply reservoir for the fluid; a first pump for circulating the fluid from the supply reservoir to the generator means; and a pressure vessel in fluid communication with the generator means for receiving heated fluid therefrom, the pressure vessel having an outlet for drawing steam therefrom.

13 Claims, 4 Drawing Sheets

FLAMELESS BOILER

FIELD OF THE INVENTION

The present invention relates to a flameless system for boiling water and, more particularly to a flameless boiler in which heat for heating the water comes primarily from the energy produced by a prime mover which may be the engine of the tractor transporting the boiler.

BACKGROUND OF THE INVENTION

In a drilling operation, steam is required throughout the drilling process and in maintenance operations after drilling has finished. Present systems generally use a conventional boiler housed in a boiler building to generate and supply the steam. Because conventional boilers use an open combustion process, the boiler building must be located at least 26 metres from the wellhead. This presents the disadvantage that the footprint of the lease site must be enlarged accordingly and more tubing is required to bring the steam to the well bore with attendant thermal losses.

Open combustion boilers have a number of additional disadvantages. The open flame is less controlled compared to the use of a flameless system which derives heat from the energy produced by an internal combustion engine. Exhaust gases are often hotter in an open combustion system and if they are not monitored these systems can flood and expel flame. The temperatures in these systems can reach instantaneous temperatures greater than the kindling temperature of natural gas. This means that if there were a natural gas leak, the danger of explosive combustion is present. A diesel or propane leak in the vicinity of the burner can also be ignited.

Further, the combustion process in an open flame system is not as complete as in enclosed systems, which can produce free radicals that escape into the atmosphere. Closed combustion systems have compression ratios commonly many times greater than open combustion burners. This lack of compression negatively affects the reactiveness of oxygen. Hydrocarbon/oxygen reactions are exothermic which provides the heat energy used by the boiler. Provided that the combustion is given enough oxygen, heat and time to complete the process, carbon dioxide and water are produced which are more benign byproducts. However, nitrogen gas is also present during combustion and if the reaction is not ideal, some molecules of nitrogen attach themselves to oxygen to produce the poisonous gas NO. This gas is referred to as a free radical. Other byproducts include carbon monoxide (CO), volatile organic compounds (VOC), and particulate matter (PM). All of these produces are well recognized as being harmful to the environment.

Some open flame systems also require more fuel than a flameless system. Fuel is burned less efficiently in these systems, sometimes requiring a greater amount of fuel to produce an equivalent amount of heat compared to a flameless system.

SUMMARY OF THE INVENTION

The present invention seeks to overcome the above disadvantages by providing a flameless boiler in which heat can be derived from an engine, which engine might also be the same engine used for other purposes, and transferred to the water to produce steam. In the present invention, heat is transferred from the engine using heat exchangers to transfer heat from the engine coolant to the water. An exhaust heat exchanger can be used to transfer heat from the engine exhaust to the heat exchange fluid. This allows the present system to recover more heat from the engine. The engine is preferably but not necessarily the engine from the truck or tractor which transports the boiler.

To make use of available excess horsepower, one or more water brakes are provided to load the engine, thereby producing more heat from the engine. Further, the shearing of the fluid in the water brake produces heat on its own. Water is used to load the water brake, and the shearing heat is thereby transferred to the water.

The water brake of the present invention provides a further advantage that it can run empty when no additional loading of the engine is required or steam generation is unnecessary. This removes the requirement for the usual gear box that disengages the water brake, saving weight and costs for this system.

The present invention therefore provides a flameless boiler comprising generator means for generating heat in fluid circulated there through by shearing of said fluid; a prime mover drivingly connected to said generator means for shearing of said fluid; a supply reservoir for said fluid; a first pump for circulating said fluid from said supply reservoir to said generator means; and a pressure vessel in fluid communication with said generator means for receiving heated fluid therefrom, said pressure vessel having an outlet for drawing steam therefrom.

BRIEF DESCRIPTION OF THE DRAWINGS

Preferred embodiments of the present invention will now be described in greater detail and will be better understood when read in conjunction with the following drawings in which.

DETAILED DESCRIPTION OF THE PREFERRED EMBODIMENTS

Figure 1:
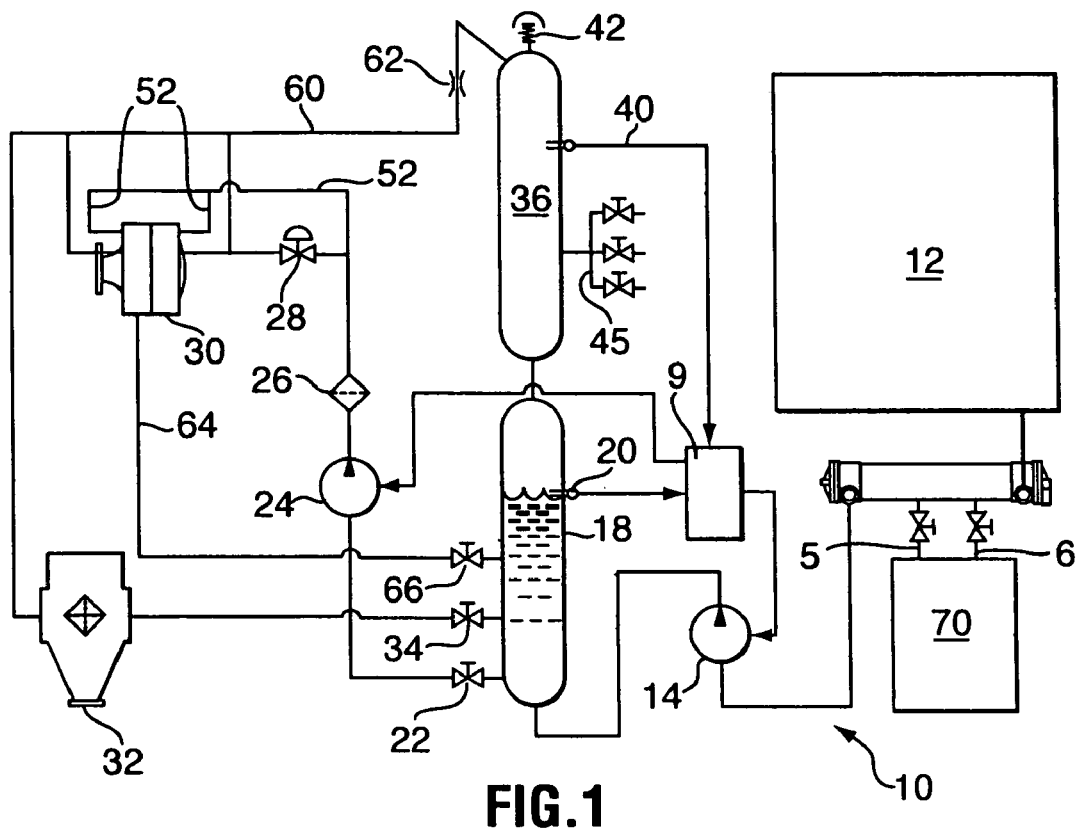
FIG. 1 is a schematic flow diagram of the flameless shear boiler.

Reference will now be made to FIG. 1 for a more detailed description of a flameless boiler unit 10. Flameless boiler unit 10 is preferably capable of producing 2.5 million BTU/hr and captures this heat from three sources: engine coolant; exhaust gases; and the use of excess engine horsepower to provide shear heat in the heat transfer fluid, which in this application will normally be water boiled to produce steam.

Heat from engine 70 is transferred to the engine's cooling system in which the coolant will be water, glycol or a mixture of the two. The heated coolant flows through line 5 to a heat exchanger 16, such as a shell and tube heat exchanger well known in the art, and returns to the engine via line 6. Both lines 5 and 6 can be valved to control the flow of coolant from the engine through exchanger 16.

Cold water for the present system is stored in a storage tank 12. A pump 14 pumps water from storage tank 12 through engine coolant heat exchanger 16. Since the heat energy rejected to the engine cooling system cannot be used to generate steam since the temperatures of the coolant are normally too low for boiling water, heat exchanger 16 is used primarily to preheat the water from tank 12 that is being pumped into a reservoir 18.

Pump 14 is a positive displacement pump and is used to add water to reservoir 18 when the water level falls below a predetermined level. Signals from a level indicator sensor 20 are used by a controller 9 to start and stop pump 14 when required.

Water from reservoir 18 is pumped from a location below the water line through a valve 22 by centrifugal pump 24. The water is then pumped through a filter 26 and, if valve 28 is open, into a shear heat generator 30. Generator 30 is typically a water brake or dynamometer mechanically coupled to engine 70.

Shear heat generator 30 results in heat being added to the water in two ways. First, while the tractor's engine is providing power to pump fluids and to operate the usual parasitic loads such as the alternator and coolant pumps, this consumes only a fraction of its available output, leaving excess capacity. Mechanically coupling the tractor's engine to generator 30 loads the engine and draws horsepower, which increases the amount of heat rejected to the engine coolant circulated through heat exchanger 16. Second, generator 30 itself converts the engine's mechanical energy into thermal energy in the water circulated through the generator sourced from reservoir 18. The water brake is set up to generate enough heat to boil the water and convert it into steam. Approximately 2546 BTU/hr is generated in a preferred shear heat generator of the present invention for each horsepower of load on the engine.

The mechanical coupling between engine 70 and generator 30 is conventional and numerous means of coupling them operationally together will occur to those skilled in the art. For example, as is known in the art, the truck's gearbox (not shown) will have one or more auxiliary power take-offs. One of these take-offs can be coupled to generator 30 such as by means of a shaft, belt or chain. Or the engine's power take-off can be drivingly coupled to a gearbox which in turn can be directly coupled to the water brake. As will be described below, one of the preferred aspects of the present invention is that adaptations to the generator allow it to run empty, which obviates the need for a gearbox, which saves considerable weight and expense.

Generally, generator 30 is a water brake which comprises a sealed chamber that is normally kept full of heat transfer fluid. A plurality of radially extending, shaft mounted blades, impellers or rotor/stators are disposed to rotate within the chamber against the shear resistance of the heat transfer fluid. The shaft is rotated by the engine being loaded through the mechanical coupling described above. The mechanical energy from the spinning rotors is converted to heat energy in the heat transfer fluid which is continuously circulated through the chamber to cool the water brake and its seals and to produce heated heat transfer fluid. In the present system, wherein the heat transfer fluid is water, the intent is to heat the water to the boiling point for the creation of steam.

Pump 24 further allows water to be pumped through shear heat generator 30 into exhaust heat exchanger 32. Heat exchanger 32 takes advantage of engine inefficiencies. Specifically, most engine inefficiencies are from the loss to the atmosphere of escaping exhaust gases. In a typical 400 hp engine, the engine may reject up to 2.8 million BTU/hr from the exhaust system alone.

Heat exchanger 32 attempts to recover approximately two-thirds of the heat loss in escaping exhaust gases. This is accomplished by using an air to liquid heat exchanger. Due to the constraints of heat exchangers, however, the remaining one-third of heat is lost to the air. Obviously, improvements to exchanger design can be expected to recover a greater proportion of exhaust heat.

Steam and boiling water from exhaust heat exchanger 32 are then forced by pressure through a valve 34 into reservoir 18.

Reservoir 18 is connected to a steam tank 36 and gravity is used to separate the steam from the water. A pressure sensor 40 is used to sense the pressure of steam in tank 36 and when this pressure falls below a predetermined value, controller 9 starts or accelerates centrifugal pump 24 to increase the flow of water to generator 30 to provide additional steam to reservoir 18 and tank 36.

Tank 36 includes a safety valve 42 in case excessive pressure is achieved to prevent rupture.

Figure 6:
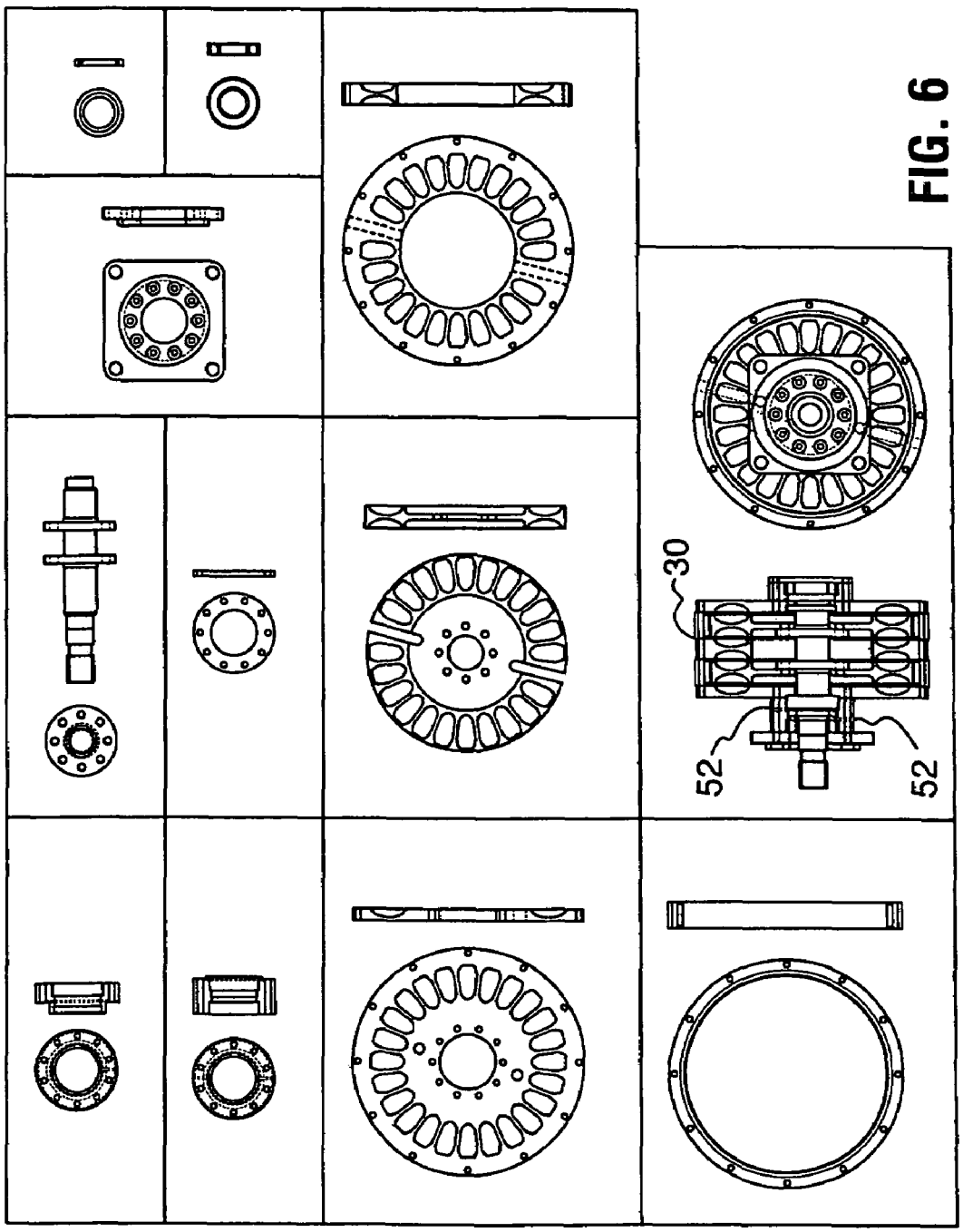
FIG. 6 is a pictorial representation of a water brake forming part of the present boiler.

Pump 24 is also used to provide water to cool seals and bearings in shear heat generator 30. Reduced diameter (eg. one-quarter inch) supply lines 52 provide water from pump 24. These small lines fluidly connect with one-eighth inch orifices inside generator 30 as shown in FIG. 6 that divert water against the generator's seals and/or bearings for times when the generator runs empty as will be described below in greater detail. Supply lines 52 bypass valve 28, and thus even if valve 28 is closed, water is still supplied to the generator for cooling purposes.

As indicated above, shear heat generator 30 can at times be allowed to run empty. This occurs when steam generation is not required. In conventional systems, a gear box would be required to disengage the generator from the engine. These gear boxes are however are heavy and expensive. To avoid this, the present shear heat generator has been adapted to run empty. Normally, this would cause the generator and its seals to burn out.

In the present system, the brakes' housing is 4140 HTSR (Heat Treated Stress Relieved) steel. Aluminum hardened to 85 rockwell is another alternative. Supply lines 52 continuously deliver a small amount of water to one-eighth inch orifices which internally direct water against the seals and/or bearings. When valve 28 is closed to stop delivery of water to shear heat generator 30, steam is allowed to flow through line 60, through restrictive orifice 62 and into shear heat generator 30 to allow any water remaining in generator 30 to drain into line 64, through valve 66 and into reservoir 18.

Without water in it, generator 30 simply spins without loading the engine. The additional hardening of the shear heat generator's housing and the continuous flow of water against the seals of the generator prevents erosion and pitting of the generator's walls and burnout, respectively. These adaptations to generator 30 provide additional advantages over conventional system water brakes which cannot be run empty.

The present system therefore derives heat from an engine coolant heat exchanger, an exhaust gas heat exchanger, and from one or more shear heat generators 30 to heat the water above boiling, which in turn provides steam to steam tank 36.

Tank 36 in a preferred embodiment will be connected to a manifold 45 on the truck bed or on the cargo box housing the boiler. This manifold will be used to fix lines to run steam to desired locations.

Another advantage of the present invention is that as pressure in tank 36 is reduced due to consumption, the boiling temperature of the water in reservoir 18 decreases, causing the water in the reservoir to boil more aggressively to maintain a full head of steam in tank 36. This effect allows the system to kick in shear heat generator 30 and exhaust heat exchanger 32 to bring the pressure in the tanks back to a set pressure which gives the users of the present boiler unit steam on demand.

Figure 2:
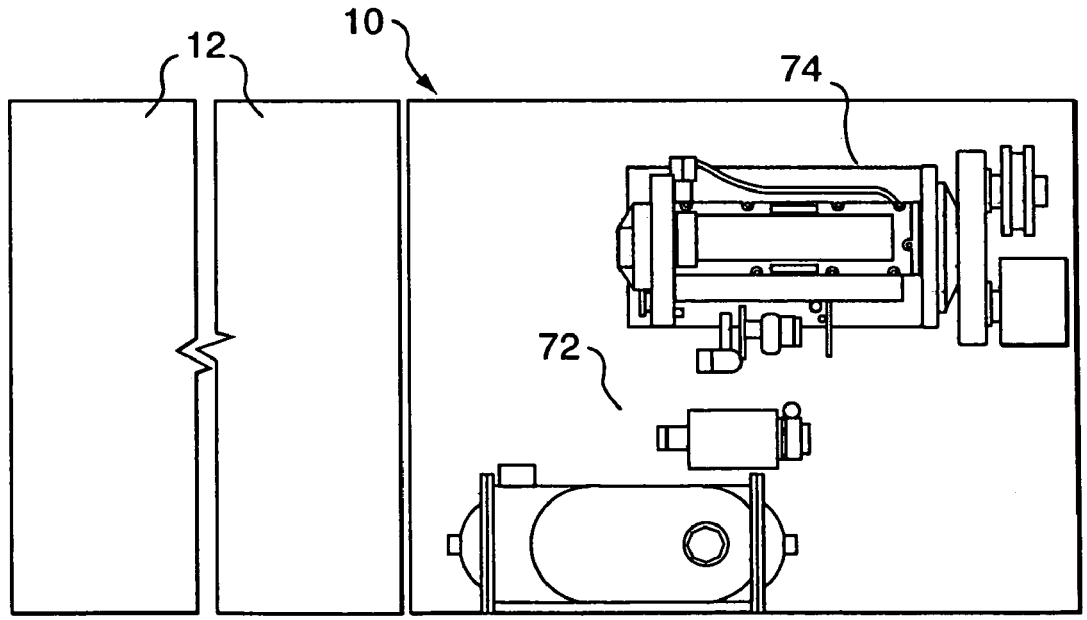
FIG. 2 is a top plan partially schematical view of a flameless shear boiler unit.
Figure 3:
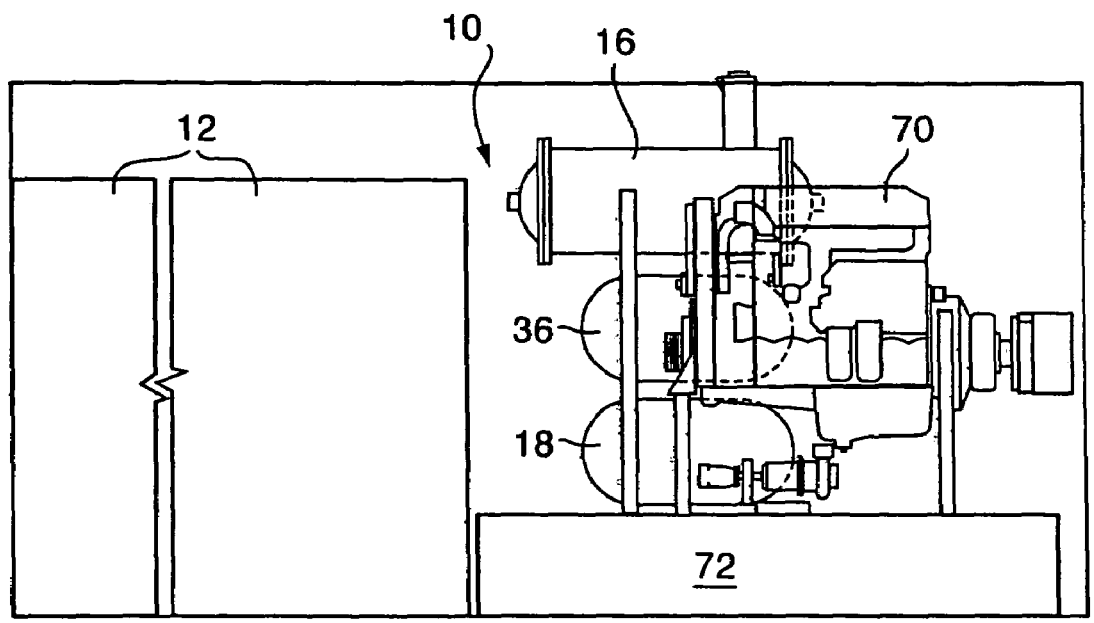
FIG. 3 is a side elevational partially schematical view of a flameless shear boiler.
Figure 4:
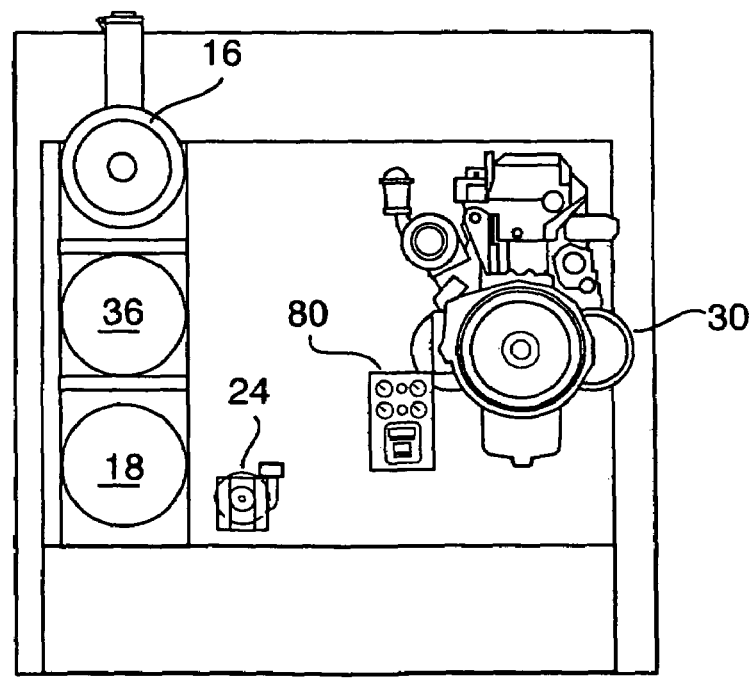
FIG. 4 is a front side elevational partially schematical view of a flameless shear boiler.

Reference is now made to FIGS. 2 to 4. All of the above described elements can be mounted on a truck for transport and mobility. A sample layout of the elements is shown in FIGS. 2 to 4. Water tank 12 is located behind a truck engine 70. The location of exhaust heat exchanger 16, steam tank 36, reservoir 18, shear heat generator 30, fuel tank 72, gear box 74, control panel 9, and centrifugal pump 24 are shown in these figures.

Figure 5:
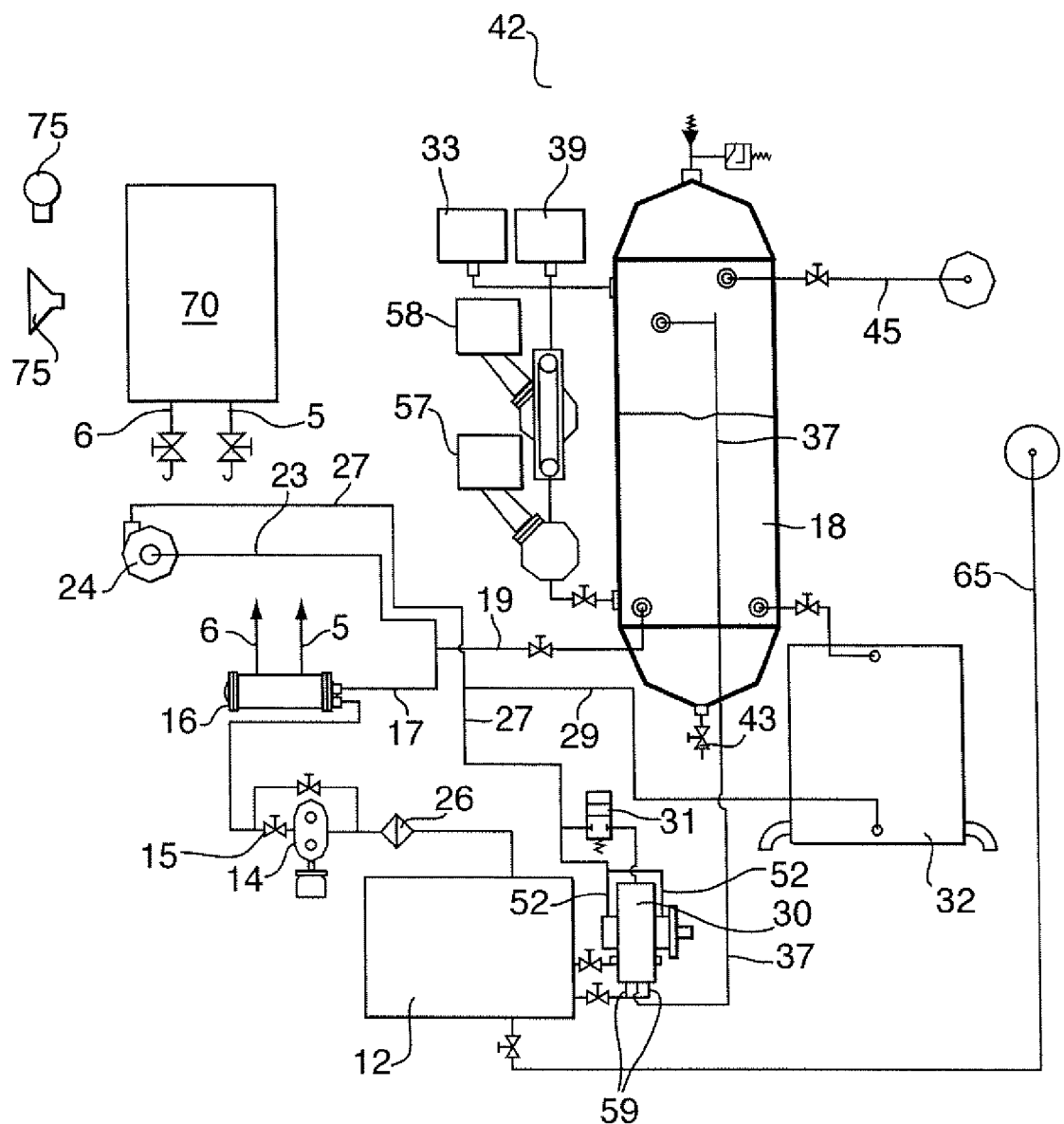
FIG. 5 is a schematic flow diagram of another embodiment of the flameless boiler.

Reference is now made to FIG. 5 which is a flow diagram for a modified flameless boiler in which like numerals have been used to identify like elements.

As in the previous embodiment, heat from engine 70's cooling system is captured by heat exchanger 16 to pre-heat water from tank 12. Pump 14 draws water from the tank for circulation to exchanger 16, the water being discharged through line 17 where the flow is split between line 19 which diverts some water directly to reservoir 18, and line 23 which directs the remaining flow to centrifugal pump 24.

From pump 24, the water is delivered through line 27 and the flow is again split, with a portion of the water being diverted into line 29 for flow through exhaust gas heat exchanger 32 and then into reservoir 18, and the remaining flow continuing through line 27 to generator 30. As in the previous embodiment, reduced diameter lines 52 connect with one-eighth inch orifices inside the generator that direct water against the generator's seals and/or bearings for times when the generator runs empty.

The main flow of water to generator 30 is controlled by an actuatable valve 31 connected to a main settable pressure cutout sensor 33 mounted on reservoir 18 as will be described in more detail below. Obviously, when valve 31 is closed, all of the flow from pump 24 is directed to exhaust heat exchanger 32 with the exception of the small amounts that continue to flow into reduced diameter lines 52. This trickle can drain back into tank 12 through lines 59 or it can drain to atmosphere. Heated water and steam produced in generator 30 return to reservoir 18 either directly through line 37 and/or through exhaust heat exchanger 32 by intersecting lines 29 and 37 (now shown).

As will be appreciated, this embodiment uses reservoir 18 for both heated water and steam collection.

The water level in reservoir 18 is maintained by lower and upper level switches 57 and 58, respectively, connected hydrostatically to the reservoir. In the event that the water level falls below a predetermined lower level, switch 57 actuates an audible and/or visual alarm 75. Switch 58 actuates pump 14 to keep the water level topped up to a predetermined level. A one way check valve 15 prevents the reverse flow of heated water from reservoir 18 into tank 12. Steam pressure is monitored by settable pressure cutout 33. Steam pressure will normally be settable within a range from approximately 10 psi to 150 psi and a normal operating range might be 80-90 psi. Cut out 33 actuates generator on/off valve 31 to maintain steam pressure within the selected range. As a safety backup in the event that cutout 33 fails, backup pressure cutout 39 is permanently set at a maximum pressure and will shut off the flame to generator 30 off if that pressure is ever reached and can also be wired to activate alarm 75.

As yet another safety backup, reservoir 18 includes a safety relief valve and over pressure switch 42. The bottom of the tank is provided with a blow down valve 43 for periodic draining to minimize the buildup of mineral deposits on the tank's inner walls. It will be appreciated however that unlike conventional boilers in which kettle cake undesirably insulates the water in the boiler from the heat source, the cake will actually insulate reservoir 18 against heat loss, which can be advantageous, provided of course that the build up does not significantly diminish the tank's capacity.

In this embodiment, there is also provided a steam return line 65 for those applications in which steam is used in a closed loop system and is therefore recoverable either as steam or as condensed water.

One skilled in the art will realize that the present system can also be mounted in a building or elsewhere and does not need to be mobile. In that case, the engine could be used for other purposes or it could be dedicated to flameless shear boiler unit 10. The boiler could be used in any application requiring steam.

The use of an internal combustion engine provides advantages over a flamed boiler. Regulatory bodies have set stringent controls for diesel engines for example. This includes lower allowable emissions set by the Environmental Protection Agency in the U.S.

There is also a fine line of control that is needed to balance the reduction of nitrogen oxides and particulate matter. Internal combustion engines are electronically controlled and can react fast enough to control emissions within each stroke of the engine. This is contrary to open flame systems in which no such controls exist.

The present invention can be retrofit using existing engines on rigs to produce steam required by the rig. Shear heat generators could be used to load the engines to make exhaust systems produce heat for steam production. When the engine is loaded up with normal rig operations, the shear heat generator can be unloaded to allow maximum power to be available to the rig.

The above described embodiments of the present invention are meant to be illustrative of preferred embodiments of the present invention and are not intended to limit the scope of the present invention. Various modifications, which would be readily apparent to one skilled in the art, are intended to be within the scope of the present invention. The only limitations to the scope of the present invention are set out in the following claims.

The embodiments of the invention in which an exclusive property or privilege is claimed are defined as follows:

1. A flameless boiler comprising:
   generator means for generating heat in fluid circulated therethrough by shearing of said fluid;
   an internal combustion engine drivingly connected to said generator means for shearing of said fluid;
   a first heat exchanger for transferring heat from the exhaust gases of said internal combustion engine to said fluid;
   a supply reservoir for said fluid;
   a first pump for circulating said fluid from said supply reservoir to said generator means; and
   a pressure vessel in fluid communication with said generator means for receiving heated fluid therefrom, said pressure vessel having an outlet for drawing steam therefrom.

2. The flameless boiler of claim 1 wherein said fluid is circulated through both of said generator means and said first heat exchanger.

3. The flameless boiler of claim 2 wherein said first heat exchanger is disposed between said generator means and said pressure vessel to be in serial fluid communication with both.

4. The flameless boiler of claim 3 wherein said generator means and said first heat exchanger are in parallel fluid communication with said pressure vessel.

5. The flameless boiler of claim 4 including a second heat exchanger for transferring heat from said internal combustion engine's coolant to fluid from said supply reservoir.

6. The flameless boiler of claim 5 including a second pump for pumping fluid from said supply reservoir into said pressure vessel.

7. The flameless boiler of claim 1 wherein said generator means is a water brake having a first inlet for fluid from said supply reservoir.

8. The flameless boiler of claim 7 wherein said water brake includes one or more supplementary inlets in fluid communication with said first pump, said supplementary inlets being sized for the delivery of a reduced amount of fluid into said water brake.

9. The flameless boiler of claim 8 including valve means disposed between said first pump and said first inlet of said water brake, said valve being operable to open and close the flow of said fluid into said water brake.

10. The flameless boiler of claim 9 wherein, when said valve means are closed, said fluid continues to be discharged in a reduced amount into said water brake through said supplementary inlets.

11. The flameless boiler of claim 10 wherein said fluid flowing through said supplementary inlets is directed at seals in said water brake for the cooling thereof.

12. The flameless boiler of claim 7 including a conduit for delivering pressurized air or steam into said first inlet of said water brake when said valve means are closed, wherein said pressurized air or steam forces fluid out of said water brake to substantially empty the same.

13. The flameless boiler of claim 7 wherein said water brake, when empty or substantially empty of said fluid reduces loading on said internal combustion engine's without being drivingly disconnected therefrom.

* * * * *